United States Patent [19]
Imamura

[11] Patent Number: 5,768,312
[45] Date of Patent: Jun. 16, 1998

[54] METHOD AND APPARATUS FOR EVALUATING DIGITAL TRANSMISSION SYSTEMS

[75] Inventor: Genichi Imamura, Kanagawa-ken, Japan

[73] Assignee: Leader Electronics Corp., Yokohama, Japan

[21] Appl. No.: 390,783

[22] Filed: Feb. 17, 1995

[30] Foreign Application Priority Data

Feb. 18, 1994 [JP] Japan .................................. 6-021283

[51] Int. Cl.$^6$ .................................................. H04B 1/38
[52] U.S. Cl. ........................ 375/228; 375/224; 375/257; 359/110; 455/67.7
[58] Field of Search ...................... 375/219–220, 375/224, 227–228, 257; 359/110, 173, 179, 188, 195; 455/67.1, 67.3, 67.4, 67.7; 356/73.1

[56] References Cited

U.S. PATENT DOCUMENTS

| | | | |
|---|---|---|---|
| 3,920,973 | 11/1975 | Avellar et al. | 375/224 X |
| 3,924,188 | 12/1975 | Hofbauer | 375/224 |
| 4,087,658 | 5/1978 | Hoppough | 324/615 |
| 4,302,843 | 11/1981 | Bauernfeind et al. | 375/224 |
| 4,351,059 | 9/1982 | Gregoire et al. | 375/224 |
| 4,789,948 | 12/1988 | von der Embse | 364/514 B |
| 4,823,360 | 4/1989 | Tremblay et al. | 375/224 X |
| 5,425,052 | 6/1995 | Webster et al. | 375/224 |
| 5,452,320 | 9/1995 | Kim et al. | 375/224 |
| 5,504,736 | 4/1996 | Cubbison, Jr. | 375/213 X |

FOREIGN PATENT DOCUMENTS

| | | |
|---|---|---|
| 1766438 | 3/1968 | Germany . |
| 3441644 A1 | 5/1986 | Germany . |
| A-57-026935 | 2/1982 | Japan . |
| 2 105 555 | 3/1983 | United Kingdom . |
| WO 91/09482 | 6/1991 | WIPO . |
| WO 94/00941 | 1/1994 | WIPO . |

OTHER PUBLICATIONS

English language foreign search report dated Jun. 15, 1995.
David K. Fibush, "Error Measurements in Studio Digital Video Systems", SMPTE Journal, Aug. 1993, pp. 688–692.
S. Webster et al., "A New Chip Set for Proposed SMPTE Standard SMPTE 259M—Serial Digital Interface", SMPTE Journal, Sep. 1993, pp. 777–785.
Michael Robin et al., "Performance Evaluation and Acceptance Testing of Bit-Serial Digital Video Equipment and Systems at the CBC", SMPTE Journal, Nov. 1993, pp. 1023–1030.
Ron Ward, "Avoiding the Pitfalls in Serial Digital Signal Distribution", SMPTE Journal, Jan. 1993, pp. 14–23.
Thomas S. Laverghetta, "9.3 TDR (Time Domain Reflectometry) Measurement", Handbook of Microwave Testing, Artech House Inc., Aug. 1985, pp. 426–433.

*Primary Examiner*—Young T. Tse
*Attorney, Agent, or Firm*—Fish & Richardson P.C.

[57] ABSTRACT

An evaluator for evaluating a digital transmission system is provided which comprises a signal power decrease detector and a system margin evaluator. The signal power decrease detector receives a digital signal which has been transmitted through the transmission medium of a transmission system so as to generate a signal power decrease signal. The system margin evaluator evaluates the system margin of the transmission system in response to the signal power decrease signal. The system margin of the digital transmission system can be evaluated in a simple and convenient manner.

32 Claims, 10 Drawing Sheets

METHOD AND APPARATUS FOR EVALUATING DIGITAL TRANSMISSION SYSTEMS

BACKGROUND OF THE INVENTION:

1. Field of the Invention

The present invention relates to digital transmission systems for transmitting digital signals including serial digital signals, and in particular, to method and apparatus for evaluating the system margin of such digital transmission systems.

2. Description of the Prior Art

In broadcasting stations or productions making programs, transmission systems have come to be used which transmit video signals in serial format through a transmission line composed of a single coaxial cable when long distance transmission of the video signals is required within a building or even between buildings. For such serial digital interface (SDI) signal transmission of the video signals (composite signals or component signals), certain standards such as SMPTE 259M standard and 10B1C standard have been established.

Digital signal transmission, not only of serial digital signals but also of parallel digital signals, is inherently problematical in that the signal transmission becomes completely unacceptable when the distance of the transmission exceeds a certain limit. An article by David K. Fibuth entitled "Error Measurements in Studio Digital Video Systems", SMPTE Journal, pp. 688–692, August 1993 shows in FIG. 2 that the transmission of an NTSC serial digital video signal through a Belden 8281 coaxial cable exhibits an abrupt increase in bit-error-rate (BER) when the length of the cable exceeds about 380 meters. Thus, any cable length exceeding 380 meters would cause the BER to exceed an allowable limit which may be for example $4 \times 10^{-7}$.

It is important therefore to ensure a sufficient system margin when constructing a digital transmission system.

In general, an SDI standard (SMPTE 259M standard) defines the level of an output signal at the transmitting end of a transmission system to be 800 mVp-p±10%. With respect to equipment to be connected to the receiving end of a coaxial cable transmission line of the system, a maximum acceptable length of laying of a reference coaxial cable (typically, 5C2V coaxial cable) is given to each receiving equipment so as to indicate that the equipment could receive acceptable level of signals if the length of the cable line is within the maximum acceptable length.

To date, there are known several approaches to the evaluation of system margins of serial digital transmission systems, and they are as follows. The first approach involves employing a cable length measurement called time-domain reflectometry (TDR), for example, because a system margin of a transmission system comprising a transmission path or line such as a coaxial cable can be determined from the length of laying of the transmission line. In this approach, a reflectometer which is connected to one end of the transmission line sends a pulse onto the transmission line. The pulse is reflected at the other end of the transmission line to return to the reflectometer which measures the time interval between the transmitting and receiving times of the pulse so as to determine the length of the cable. The second approach involves direct observation of the waveform of a serial digital signal at the receiving end of the transmission line by means of an oscilloscope so as to measure the level and/or signal-to-noise ratio of the signal. The third approach uses an additional cable of a known length which is connected to the receiving end of the coaxial cable transmission line with the output of the additional cable being connected to receiving equipment. Then, an operational serial digital video signal is sent out to the transmitting end of the transmission line and reproduced by the receiving equipment to test.

However, all of the conventional approaches suffer from respective shortcomings. Specifically, the first approach or TDR is limited in that the approach is not sufficient for complete evaluation of the system margin of transmission system although the exact length of a cable can be determined, because any degradation of transmitted signals received is caused not only by the cable itself, but also by various elements other than the cable, such as connectors and switchers of video signals, and even by decrease in level of an output at the transmitting end. Also, the effects on the transmitted signals by the various elements other than the cable may vary during operation of the transmission system. Further, a transmission line may be composed of two or more different types of cables which have different attenuation characteristics.

The second approach using an oscilloscope requires a large, massive and expensive oscilloscope, because serial digital video signals have a very wide bandwidth typically ranging from 1 to 2 GHz. Thus, this approach is not suitable for convenient and easy measurement.

The third approach, though it enables the determining of whether a system margin corresponding to the length of the additional cable is ensured or not, cannot provide a more precise and accurate evaluation of the system margin. Further, the known length cable required makes this approach unsuitable for convenient and easy measurement.

Moreover, similar problems arise when the transmission media are wire transmission paths composed of cables other than coaxial cables, such as fiber optics cables, or wireless transmission paths through such as air. The above mentioned problems arise in principle not only when the transmitted signals are serial digital signals but also when they are parallel digital signals.

SUMMARY OF THE INVENTION

In view of the foregoing, it is an object of the present invention to provide method and apparatus for evaluating the system margin of a digital transmission system in a convenient manner.

It is another object of the present invention to provide method and apparatus for providing more precise evaluation of the system margin of a digital transmission system.

It is a further object of the present invention to provide method and apparatus for providing total evaluation of the system margin of a digital transmission system.

In accordance with one aspect of the present invention, an evaluation method for evaluating a system margin of a digital transmission system is provided which comprises the steps of: a) receiving a digital signal transmitted through said transmission system; b) detecting a decrease in signal power of said transmitted digital signal; and c) generating an indication relating to the system margin of said transmission system based on the detected signal power decrease.

According to the present invention, said step of generating an indication may include representing said indication relating to the system margin in a unit associated with a length of said transmission medium. Also, the step may include using a known relationship between a propagation length and a signal power decrease of a signal with respect to at least one type of known transmission medium. Further, the step may include generating said indication relating to the system margin with respect to one selected from a plurality of different types of transmission media.

According to the present invention, said indication relating to the system margin may be generated based on the propagation length of a signal through said transmission medium. Then, said indication relating to the system margin may be represented by (1) said propagation length or (2) the ratio of said propagation length to a maximum acceptable propagation length of said transmission medium. Alternatively, said indication relating to the system margin may be generated based on an acceptable remaining propagation length, said acceptable remaining propagation length being equal to the difference between a maximum acceptable propagation length of said transmission medium and a propagation length through said transmission medium. Then, said indication relating to the system margin may be represented by (1) said acceptable remaining propagation length or (2) the ratio of said acceptable remaining propagation length to said maximum acceptable propagation length of said transmission medium.

Further, according to the present invention, said step of detecting a signal power decrease may comprise the steps of: a) extracting, from said transmitted digital signal, components within a predetermined frequency band to generate the extracted components as an extracted output; b) detecting a magnitude in power of said extracted output so as to provide an detected output representing the detected magnitude; and c) detecting a difference between said detected output and a predetermined reference value to generate the detected difference as said detected decrease. The predetermined frequency band may include at least a frequency band within which said digital signal is most strongly affected by said transmission medium during transmission of said digital signal through said transmission medium.

Moreover, according to the present invention, said transmission medium may comprise a wire transmission path such as a coaxial cable or a fiber optics cable, or may comprise a wireless transmission path. Further, said digital signal may be a serial digital signal.

In accordance with another aspect of the present invention, an evaluation apparatus for evaluating a system margin of a digital transmission system is provided which comprises: a) an input terminal for receiving a digital signal transmitted through said transmission system; b) a signal power decrease detecting means for detecting a decrease in signal power of said transmitted digital signal received at said input terminal; and c) an evaluator means for generating an indication relating to the system margin of said transmission system based on the detected signal power decrease. Further, according to the present invention, said evaluator means may represent said indication relating to the system margin in a unit associated with a length of said transmission medium.

According to the present invention, said signal power decrease detecting means may comprise: a) a frequency band components extracting means for extracting from said transmitted digital signal received at said input terminal, frequency components within a predetermined frequency band to generate the extracted components as an extracted output said predetermined frequency band including at least a frequency band within which said digital signal is most strongly affected by said transmission medium during transmission of said digital signal through said transmission medium; b) detecting means connected to receive said extracted output from said extracting means for detecting a magnitude in power of said extracted output to generate a detected output representing the detected magnitude; and c) difference detecting means connected to receive said detected output for detecting a difference between said detected output and a predetermined reference value to generate the detected difference as said detected signal power decrease.

Further, according to the present invention, said signal power decrease detecting means may comprise an equalizer internally generating an equalization control variable signal for controlling an amount of equalization. Then, said equalization control variable signal may serve as said signal power decrease. According to the present invention, said equalizer may comprise: a) summing means having a first input for receiving said transmitted digital signal received at said input terminal, a second input and an output for generating a sum of said first and second inputs; b) a variable filter having an input for receiving said transmitted digital signal and an output connected to said second input of said summing means; c) a peak detector having an input coupled to said output of said summing means for detecting a level of said output of said summing means; and d) a filter control circuit having an input for receiving the detected level from said peak detector and an output for generating a filter control signal for controlling said variable filter in response to the detected level received at said input and a predetermined reference value, said filter control signal being operative to adjust a characteristic of said variable filter so as to cause said output of said peak detector to be equal to said predetermined reference value. Then, said filter control signal may serve as said equalization control variable signal.

Moreover, according to the present invention, said evaluator means may comprise: a) an amplifier (142A); and b) an indicator adapted to receive an output of said amplifier and including scale means for indication. The scale means may comprise at least one scale. Also, said amplifier may have an adjustable variable gain, or may have an adjustable variable characteristic.

Further, according to the present invention, said evaluator means may comprise: a) look-up table storage means storing a look-up table for correlating a signal power decrease of a signal with a propagation length of the signal with respect to at least one type of known transmission medium; b) means for generating a reference transmission medium type specifying signal, said reference transmission medium type specifying signal being operative to specify, among said at least one type of known transmission medium, a reference type of transmission medium for indication of the system margin; c) means for generating a margin indication type specifying signal, said margin indication type specifying signal being operative to specify a type of system margin indication; d) means for generating a maximum acceptable propagation length specifying signal, said maximum acceptable propagation length specifying signal being operative to specify a maximum acceptable propagation length ($L_{AMAX}$) of said reference type of transmission medium; e) system margin calculation means for calculating a value of the system margin in a unit associated with a length of said selected reference type of transmission medium, in response to said detected power decrease from said detecting means, said reference transmission medium type specifying signal, said margin indication type specifying signal and said maximum acceptable propagation length specifying signal; and f) display means for displaying the calculated value of the system margin.

BRIEF DESCRIPTION OF THE DRAWINGS

The present invention will hereinafter be explained in connection with the preferred embodiments with reference to the accompanying drawings.

DETAILED DESCRIPTION OF THE PREFERRED EMBODIMENTS

Figure 1:
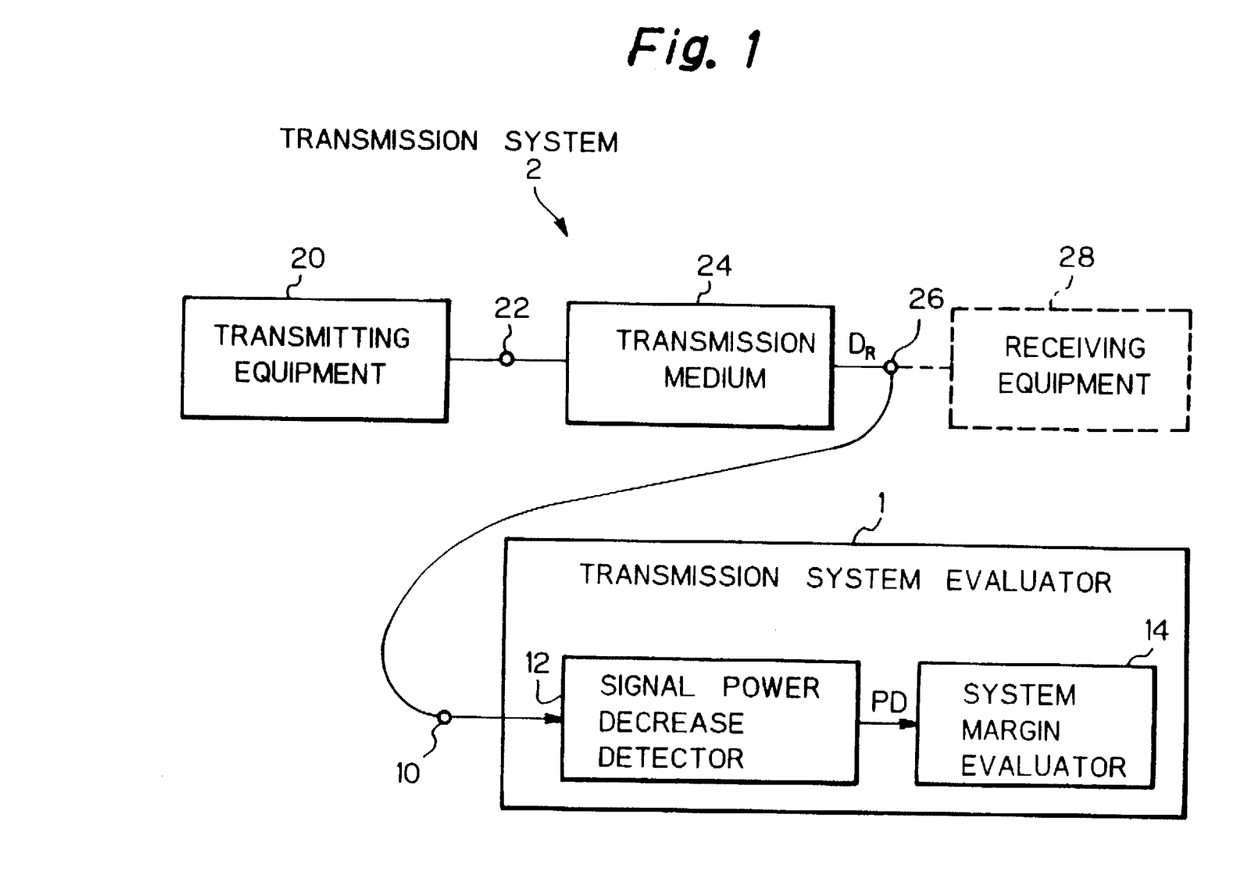
FIG. 1 is a block diagram showing a transmission system evaluator having a basic arrangement in accordance with the present invention and a digital transmission system to be evaluated by the system evaluator.

Referring now to FIG. 1, a transmission system evaluator 1 according to the present invention and a digital transmission system 2 to be evaluated by the evaluator 1 are shown. The digital transmission system 2 typically comprises transmitting equipment 20, a transmission medium 24 having a signal transmitting end 22 for connection to the transmitting equipment, receiving equipment 28 for connection to a signal receiving end 26 of the transmission medium. In the transmission system 2, the transmission medium 24 may be a wire transmission path (e.g., coaxial cable and fiber optics cable) or a wireless transmission path.

The evaluator 1 having a basic arrangement shown in FIG. 1, for the purpose of evaluating the system margin of the transmission system, comprises an input terminal 10 to be connected to the receiving end 26 of the transmission medium 24 for receiving a digital signal DR transmitted through the transmission medium 24, a signal power decrease detector 12 connected to the input terminal 10, and a system margin evaluator 14. The signal power decrease detector 12 receives a signal from the input terminal 10 and detects a decrease in power of the signal by comparing the power level with a predetermined reference value (for example, an output (power) level at the transmitting end 22 which is defined by some standard or selected arbitrarily). The result of the detection is represented by a signal power decrease signal PD generated by the detector 12, which is supplied to the subsequent system margin evaluator 14. The evaluator 14 generates an indication relating to the system margin of the transmission system 2, based on the signal power decrease represented by the signal PD received.

The transmission system evaluator 1 of FIG. 1 can be used for the evaluation of not only transmission systems transmitting serial digital signals but also those transmitting parallel digital signals. Further, the evaluator 1 does not require any specialized signal such as test signals for evaluation purpose. The evaluator 1 is able to evaluate system margins of transmission systems using ordinary transmitted signals or operational signals.

Next, several embodiments of the evaluator 1 having the basic arrangement will be described in more detail. For the purpose of illustration, it is assumed that in the following description the transmission system 2 is adapted for transmission of a serial digital (SD) composite video signal as defined by SMPTE 259M standard (a composite signal (transmission rate 143 Mbps); a component signal (transmission rate 270 Mbps)) and that the transmission medium 24 is a coaxial cable transmission line.

Figure 2:
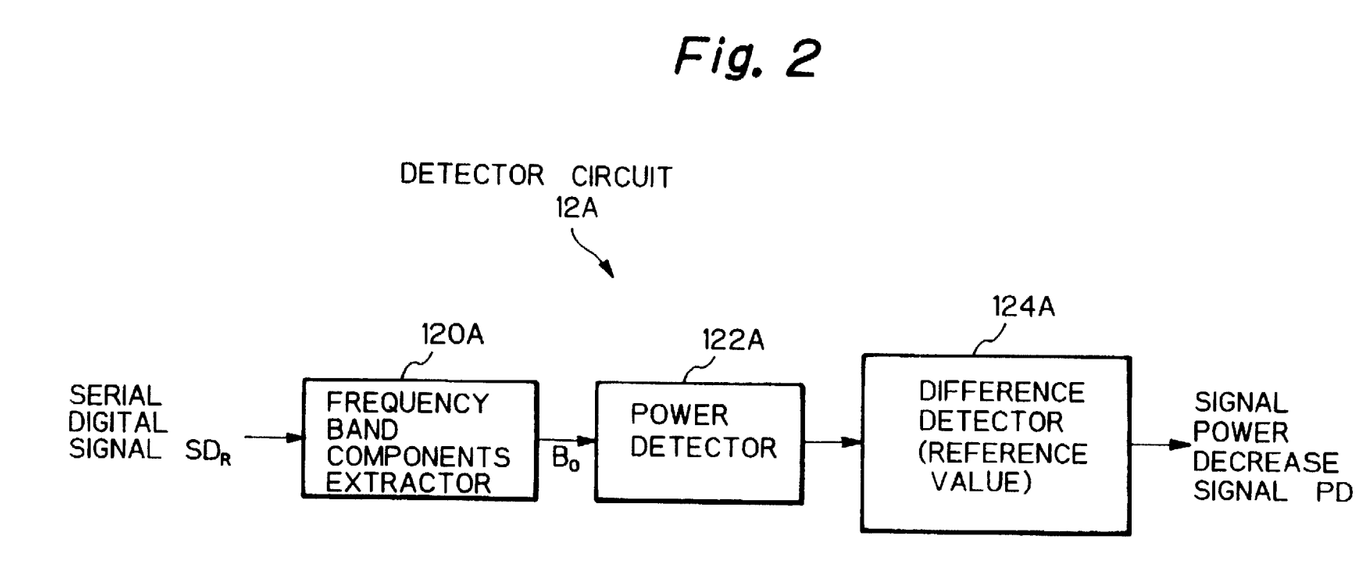
FIG. 2 is a block diagram showing a detector circuit 12A which is a more specific embodiment of a signal power decrease detector 12 within the evaluator of FIG. 1.

FIG. 2 shows the block diagram of a detector circuit 12A which is a more specific arrangement of the signal power decrease detector 12 in FIG. 1. The detector circuit 12A comprises a frequency band components extractor 120A adapted to receive a digital signal $D_R$ after transmission or an SD (serial digital) signal $SD_R$ in this case, a power detector 122A and a difference detector 124A. The frequency band components extractor 120A may comprise a band-pass filter and serves to extract, from the signal $SD_R$, frequency components within a predetermined frequency band which includes preferably at least frequency components which provide the best detection of the decrease in power of the serial digital signal during transmission. The extracted components are generated as extracted output $B_o$.

Figure 3:
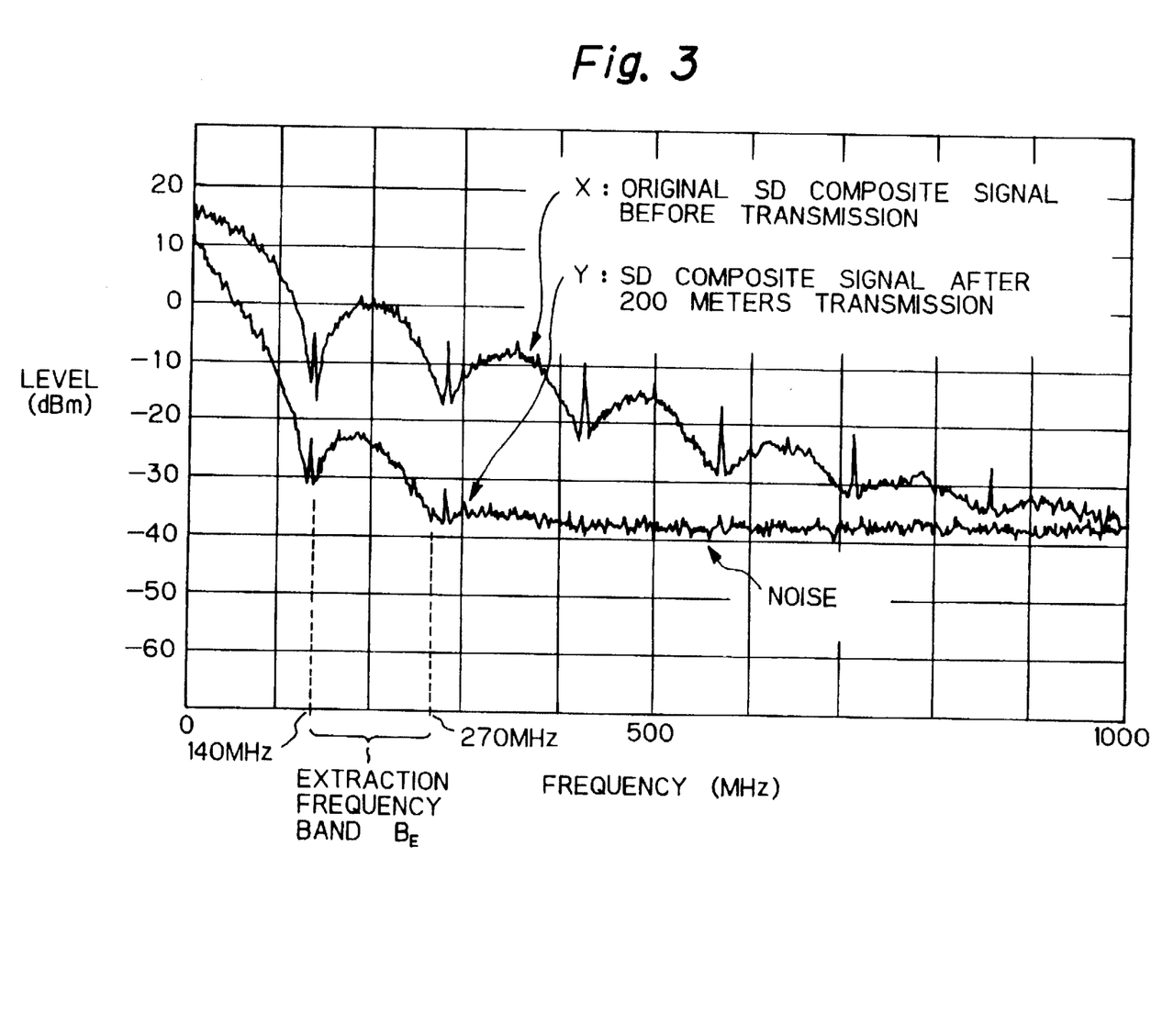
FIG. 3 is a frequency spectral diagram showing a serial digital (SD) composite signal before and after transmission.

Referring now to the frequency spectral diagram shown in FIG. 3, the frequency band suitable for extraction will be described. In the spectrum diagram, an upper curve X represents the spectrum of the SD composite signal before transmission, while a lower curve Y represents the spectrum of the same SD composite signal after transmission through a coaxial cable of 200 meters long. As seen, the SD composite signal has a wide bandwidth up to 1 GHz or more. Spectrum curve Y shows that noise appears dominantly in the range above about 300 MHz. In this embodiment, the extractor 120A is designed to have a frequency band for extraction $B_E$ ranging from 140 to 270 MHz. This band is selected because the difference between the signal levels before and after transmission is more than 20 dB at frequencies about 200 MHz, while it is about 15 dB or less at frequencies below 100 MHz. Further, the difference between the signal levels is meaningless at frequencies above 300 MHz since the level of the signal after transmission is submerged below the noise level and thus undetectable. Accordingly, the main factors which determine the upper limit of an extraction frequency band are the presence of signal components and the magnitude of a signal level difference, while the main factor which determines the lower limit of the band is the magnitude of a signal level difference. The thus selected extraction frequency band is advantageous, because the extraction band can also be used for an SD component signal (having transmission rate of 270 Mbps) which has a frequency spectrum different from that of a SD composite signal (having transmission rate of 143 Mbps) (the former spectrum is generally shifted to the higher relative to the latter).

The subsequent power detector 122A which is connected to receive the extracted output $B_o$ from the extractor 120A, may comprise a peak detector and serves to detect the power level of the extracted output $B_o$, resulting in generation of a detected power level signal. This signal is applied to the difference detector 124A which may comprise a differential amplifier and which is provided with a reference value which is the value corresponding or correlated to the power level of the SD signal having the above-mentioned transmitting end output level (800 mVp-p). The difference between the reference value and the value of the detected power level signal is represented by a differential signal which is generated as the signal power decrease signal PD mentioned above.

Figure 4:
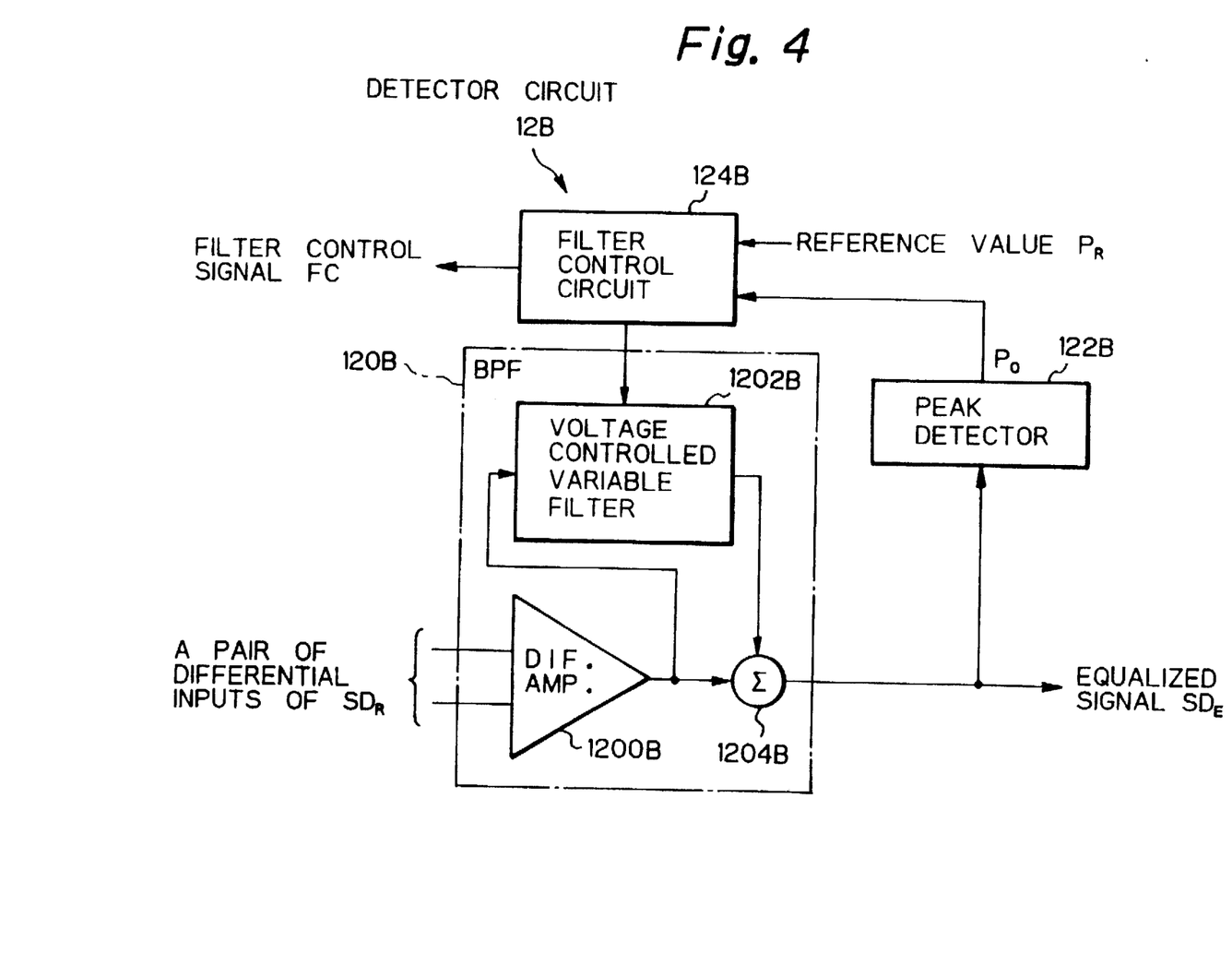
FIG. 4 is a block diagram showing a detector circuit 12B which is a more specific embodiment of the detector circuit 12A shown in FIG. 2.

Referring now to FIG. 4, the block diagram of a detector circuit 12B is shown which is a more specific embodiment of the detector circuit 12A in FIG. 2. The detector circuit 12B is arranged utilizing an equalizer which is used in the field of transmissions. While the equalizer shown is one of the most common adaptive equalizers, other equalizers may be used as well. It is required, however, that the equalizer used internally generates a signal which relates to the amount of equalization of a signal, or a variable signal for equalization control (for example, a filter control signal in an equalizer including a variable filter, or an auto gain control (AGC) signal in an equalizer including an AGC amplifier).

The equalizer-based detector circuit 12B in FIG. 4 comprises a band-pass filter (BPF) 120B corresponding to the extractor 120A in FIG. 2, a peak detector 122B corresponding to the detector 122A, and a filter control circuit 124B corresponding to the difference detector 124A. As shown in FIG. 4, the band-pass filter 120B comprises a differential amplifier 1200B for receiving a pair of differential inputs of a SD signal $SD_R$ from the coaxial cable, a voltage controlled variable filter 1202B connected to receive an output from the differential amplifier 1200B, and a summer 1204B for generating the sum of the outputs from the variable filter 1202B and the differential amplifier 1200B. The band-pass filter 120B generates an equalized signal $SD_E$. The voltage controlled variable filter 1202B is a high-pass filter which includes a variable capacitance diode (not shown) having a variable capacitance depending on the control voltage. The pass band of the high-pass filter preferably includes the above mentioned extraction frequency band $B_E$. The band-pass filter 120B including the high-pass filter has a band-pass function as a whole, because the high-pass filter inherently has an upper limit to its pass-band.

The equalized signal $SD_E$ generated from the output of the band-pass filter 120B is applied to the peak detector 122B which may comprise for example a diode detector including a diode and a capacitor and which generates a DC detected output voltage $P_o$ representing the peak-to-peak value of the equalized signal $SD_E$. The detected output voltage $P_o$ is applied as an input to the filter control circuit 124B which may comprise a differential amplifier. The filter control circuit 124B receives as another input a reference value PR (e.g., 800 mV) such that the difference between the two inputs is derived and generated as a filter control signal FC. The signal FC is applied to the voltage controlled filter 1202B after the signal FC is converted into voltage form and to a control voltage for the variable capacitance diode. The variable filter 1202B which receives the control voltage, is controlled to vary its filtering characteristic to perform compensational operation in such a direction that the equalized signal $SD_E$ has a predetermined level.

Figure 5:
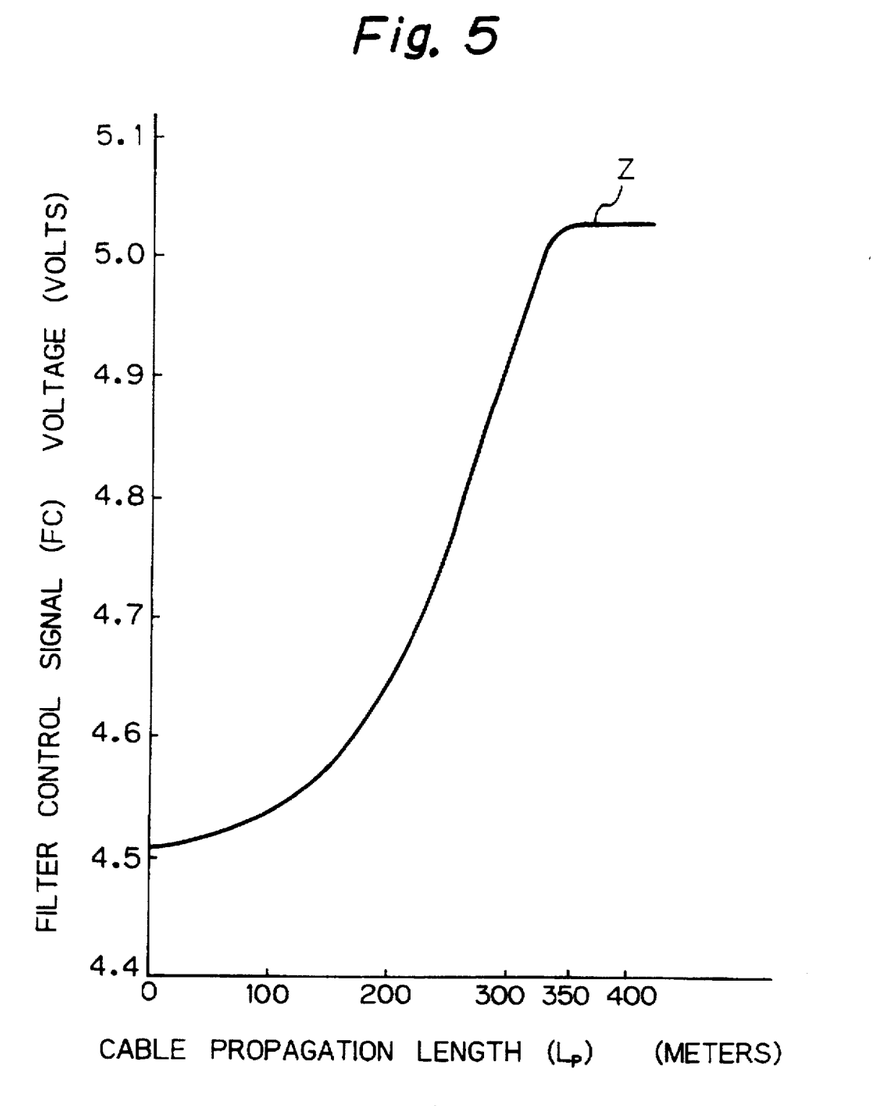
FIG. 5 is a plot showing the relationship between the value (voltage) of an equalizer filter control signal FC generated by an equalizer shown in FIG. 4 and a propagation length $L_P$ through a reference cable.

FIG. 5 is a plot showing the relationship between the value (voltage) of the filter control signal FC and the propagation length $L_P$ of a transmitted signal through a 5C2V coaxial cable commonly used as a reference cable for the video broadcasting purpose. Here, since it is assumed that the transmission path is a wire transmission line, the propagation length $L_P$ means the length of that reference coaxial cable through which an SD signal is transmitted. As seen from curve Z in the plot, there is a generally S-shaped non-linear but definite relationship between the voltage of the filter control signal FC and the propagation length $L_P$. The existence of such a relationship is well known in the art. Because the filter control signal FC has a definite correlation with the signal power decrease, it can be used as the power decrease signal PD mentioned above.

Figure 6:
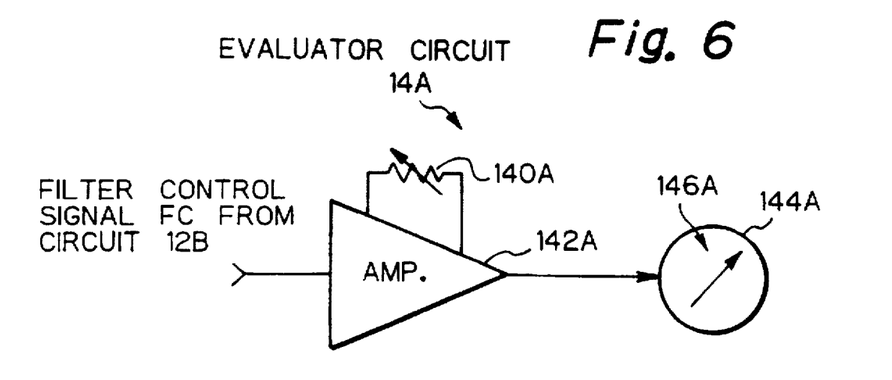
FIG. 6 is a circuit diagram showing an evaluator circuit 14A which is a more specific embodiment of the system margin evaluator 14 shown in FIG. 1.

Referring now to FIG. 6, an evaluator circuit 14A which is a more specific embodiment of the system margin evaluator 14 in FIG. 1 will be described. The evaluator circuit 14A is an example having a relatively simple arrangement, and comprises an amplifier 142A which receives the power decrease signal PD, i.e., the filter control signal FC in this embodiment and which is provided with a variable resistor 140A for variation of the gain of the amplifier. The evaluator circuit 14A also includes an indicator 144A which receives an output from the amplifier 142A to indicate the system margin. The indicator 144A is, in this embodiment, an ammeter with a scale 146A for indication of the system margin.

FIG. 7(a) to FIG. 7(e) show several examples of the indicator scale 146A. It should be noted that the scale examples shown in FIGS. 7(a)–7(e) indicate the system margin in units that are associated with the propagation length $L_P$ of a 5C2V reference coaxial cable. Thus, even if an actual transmission line to be evaluated is implemented using a different type of cable from that of the reference cable, the system margin is indicated based on the length of the reference cable, because such margin indication is convenient for consistent grasping of margins, and is also currently common. Nevertheless, it is possible to use such scales that indicate the system margin based on the length of any individual cable, if desirable.

Figure 7A:
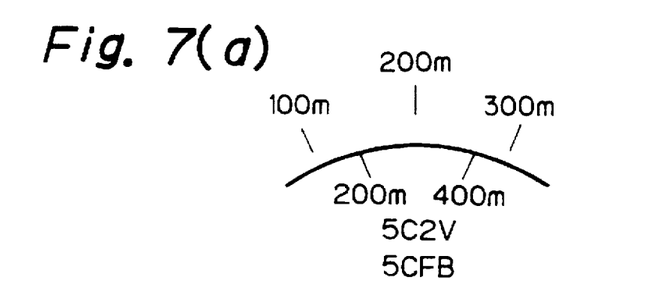
FIG. 7(a) to FIG. 7(e) show examples of the scale of an indicator shown in FIG. 6.
Figure 7B:
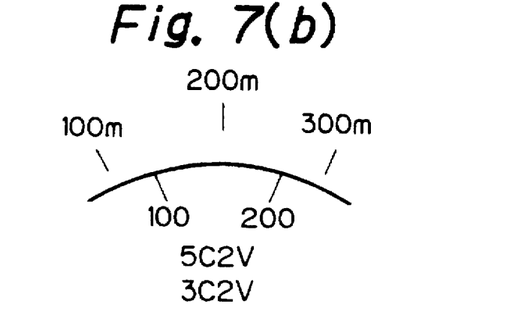
Figure 7C:
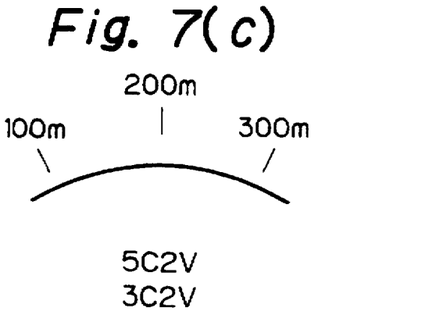
Figure 7D:
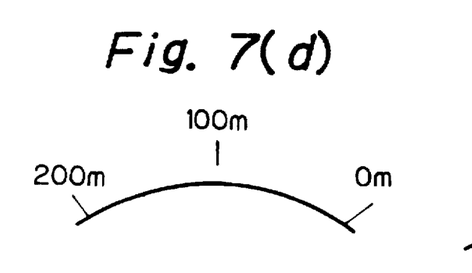
Figure 7E:
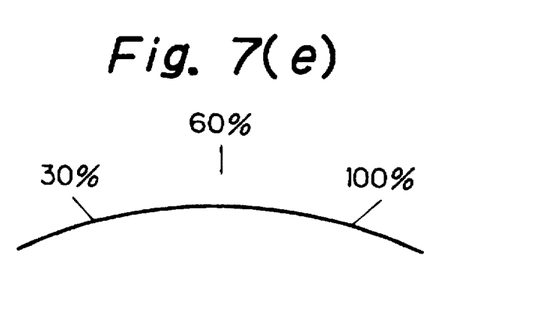

The scales shown in FIG. 7(a) to FIG. 7(c) are adapted for indication by an "equivalent" line-length $L_E$ of the reference cable. The scale shown in FIG. 7(d) is adapted for indication by an "equivalent" remaining-line-length $L_{RE}$ of the reference cable. The scale in FIG. 7(e) is for indication by an "equivalent" line-length-ratio $R_E$. The other type of indication is by an "equivalent" remaining-line-length-ratio $R_{RE}$. The term "equivalent" is used here to mean that any signal power decreases due to respective elements other than a cable (i.e. connectors or switchers in a cable transmission line and any drop in the transmitting end output level, as mentioned before) are also treated as those due to cable propagation and the decreases are represented by the respective equivalent lengths of the cable for indication of the system margin. Thus, the terms are defined as follows:

Table 1

Equivalent-line-length $L_E$:

Equivalent propagation length $L_P$ through the reference cable.

Equivalent-remaining-line-length $L_{RE}$:

The difference between the maximum acceptable length $L_{AMAX}$ of the reference cable (e.g., 300 meters) and the equivalent-line-length ($=L_{AMAX}-L_E$).

Equivalent-line-length-ratio $R_E$:

The ratio of the equivalent-line-length to the maximum acceptable length (%) ($=100 \times L_E/L_{AMAX}$).

Equivalent-remaining-line-length-ratio $R_{RE}$:

The ratio of the equivalent-remaining-line-length to the maximum acceptable length (%) (=100×$L_{RE}/L_{AMAX}$).

Specifically, the first double-scale shown in FIG. 7(a) provides margin indication for two different coaxial cables 5C2V and 5CFB, which are the same in diameter (represented by "5C") but different in type ("2V" and "FB"). The upper scale is for 5C2V cable, and the lower scale for 5CFB cable. Because the relationship between the filter control signal FC and the propagation length is non-linear, both the upper and lower scales are non-linear. Further, because different types of coaxial cables have different cable attenuation characteristics which are non-linear with each other, the upper and lower scales are not proportional to each other. It should be noted that if a cable transmission line uses only the reference cable (5C2V), the lower scale is unnecessary.

The double-scale shown in FIG. 7(b) is arranged for two different coaxial cables 5C2V and 3C2V, which are the same in type (represented by "2V") but different in diameter ("5C" and "3C"). Since there is a linear relationship between the cable attenuation characteristics of coaxial cables of the same type but with different diameters, the upper scale (for 5C2V cable) and the lower scale (for 3C2V cable) are proportional to each other. Note, however, that each of the upper and lower scales itself is non-linear, as with the scale of FIG. 7(a). The example shown in FIG. 7(c) is used for two different coaxial cables 5C2V and 2C2V as with the double-scale in FIG. 7(b) but is provided with a single-scale. In this case, because the attenuation characteristics of the coaxial cables are in linear relation to each other, indication for the two cables can be provided by changing the gain of the amplifier 142A through the use of the variable resistor 140A.

The example in FIG. 7(d) shows indication by the equivalent-remaining-line-length and is provided with a single-scale. In this example, if the provision of indication for two types of cables such as described in the examples shown in FIGS. 7(a), 7(b) and 7(c) is desired, the example of FIG. 7(d) can be modified by providing an additional scale or changing the amplifier gain, as described in the examples of FIGS. 7(a), 7(b) and 7(c).

For indication by the equivalent-remaining-line-length-ratio, the scale in FIG. 7(d) may be modified such that the unit of the scale is changed from meters to percent. Similarly, for indication by the equivalent-line-length-ratio, the scales in FIG. 7(a), FIG. 7(b) and FIG. 7(c) may be modified so that the unit of the scales is changed from meters to percent. The scale shown in FIG. 7(e) is an example of such modification. It should be noted that maximum acceptable lengths specific to individual receiving equipment can be used for the remaining-line-length type indications or the ratio type indications by changing solely the gain of the amplifier 142A or by changing the characteristic of the amplifier 142A in addition to the changing of the gain. The characteristic change of the amplifier 142A may be made by adjusting a characteristic or by selecting one from a plurality of characteristics.

The evaluator circuit 14A described above is advantageous in that non-linear indication of the system margin can be provided using a simple circuit structure.

Figure 8:
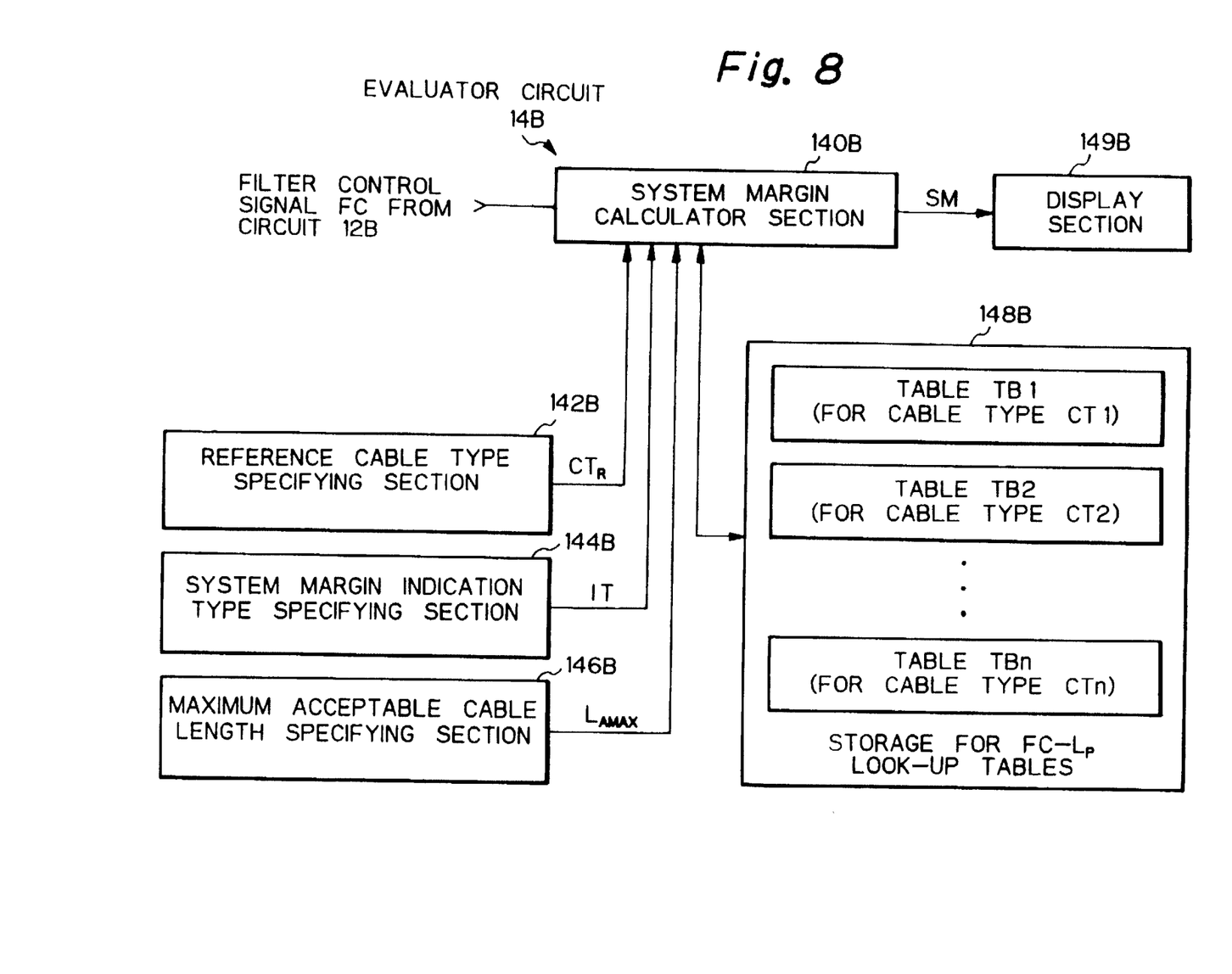
FIG. 8 is a block diagram showing an evaluator circuit 14B which is another specific embodiment of the system margin evaluator 14 shown in FIG. 1.

Referring now to FIG. 8, an evaluator circuit 14B which is another specific embodiment of the system margin evaluator 14 in FIG. 1 will be described. The evaluator circuit 14B has higher flexibility than the evaluator circuit 14A in FIG. 6 and can serve as a universal evaluation means. FIG. 8 shows a functional block diagram of the evaluator circuit 14B. As shown, the evaluator circuit 14B includes a system margin calculator section 140B having an input for receiving the filter control signal FC. Also, the evaluator circuit 14B includes a reference cable type ($CT_R$) specifying section 142B, a system margin indication type (IT) specifying section 144B and a maximum acceptable cable length ($L_{AMAX}$) specifying section 146B. The calculator 140B has further inputs for receiving $CT_R$, IT and $L_{AMAX}$ specifying signals, respectively. Further, the evaluator circuit 14B includes a storage section 148B which stores n look-up tables each of which correlates the values of the filter control signal FC with the values of the propagation length $L_P$, where the number "n" is equal to or greater than "1", and preferably is equal to or greater than "2". In the embodiment shown, the storage stores a look-up (LU) table TB1 which defines the relationship between the values of the filter control signal FC and the values of the propagation length (similar to that shown in FIG. 5) with respect to a cable of cable type CT1, a similar LU table TB2 with respect to a cable of cable type CT2, ... and a similar LU table TBn with respect to a cable of cable type CTn. All the tables are prepared with the reference value $P_R$ described with reference to FIG. 4 being equal to a value corresponding to the transmitting end output level of 800 mV (SMPTE 259M standard). Other values may be used as the reference value $P_R$ based on which the tables are prepared, depending on a particular transmission system to be evaluated.

The calculator 140B is connected to the storage 148B in order to look-up a value of the propagation length $L_P$ of a cable based on a value of the filter control signal CF. Further, the evaluator circuit 14B comprises a display section 149B which is connected to the calculator 140B to receive therefrom a system margin SM for display.

Now, the specifying signals $CT_R$, IT, and $L_{AMAX}$ will be described in more detail. Signal $CT_R$ specifies the type of a cable to be used as the reference cable based on which system margin indication is to be made, and in this embodiment, it selects one of the cable types CT1–CTn. IT specifying signal in this embodiment selects one of the four indication types including the above-mentioned equivalent-line-length ($L_E$) type, equivalent-remaining-line-length ($L_{RE}$) type, equivalent-line-length-ratio ($R_E$) type and equivalent-remaining-line-length-ratio ($R_{RE}$) type. Signal $L_{AMAX}$ specifies a maximum acceptable length for the reference cable. The specified maximum acceptable length may be constant regardless of receiving equipment or may be modified to be equal to a different length depending on the receiving equipment, if necessary. The system margin SM generated from the calculator 140B has an unit and value depending on the specifying signals.

Figure 9:
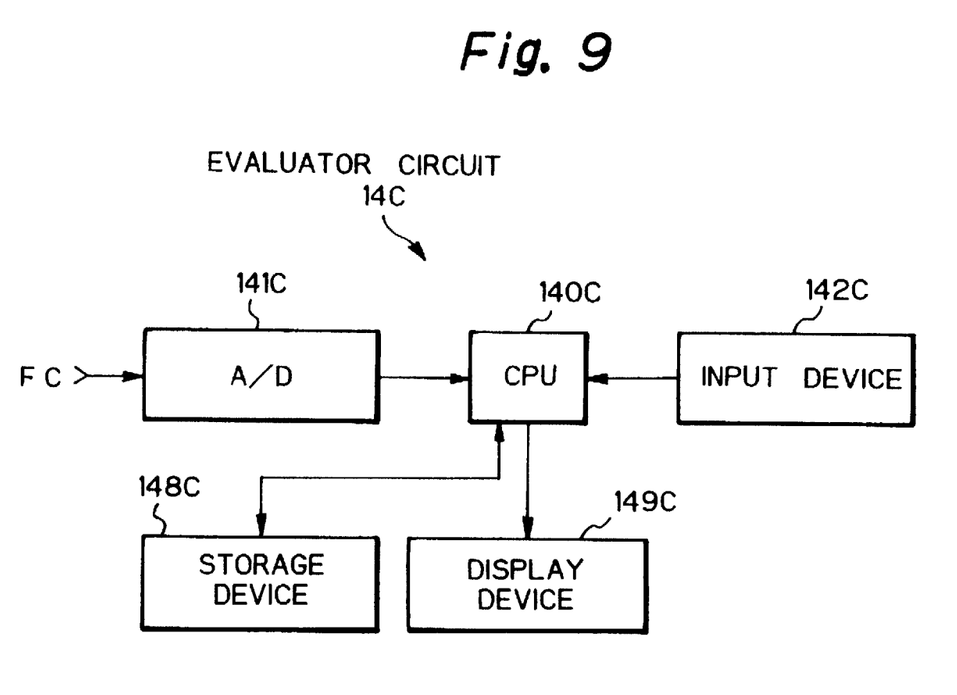
FIG. 9 is a block diagram of an evaluator circuit 14C which is an embodiment of the evaluator circuit 14B shown in FIG. 8 and is implemented using a microprocessor.
Figure 10:
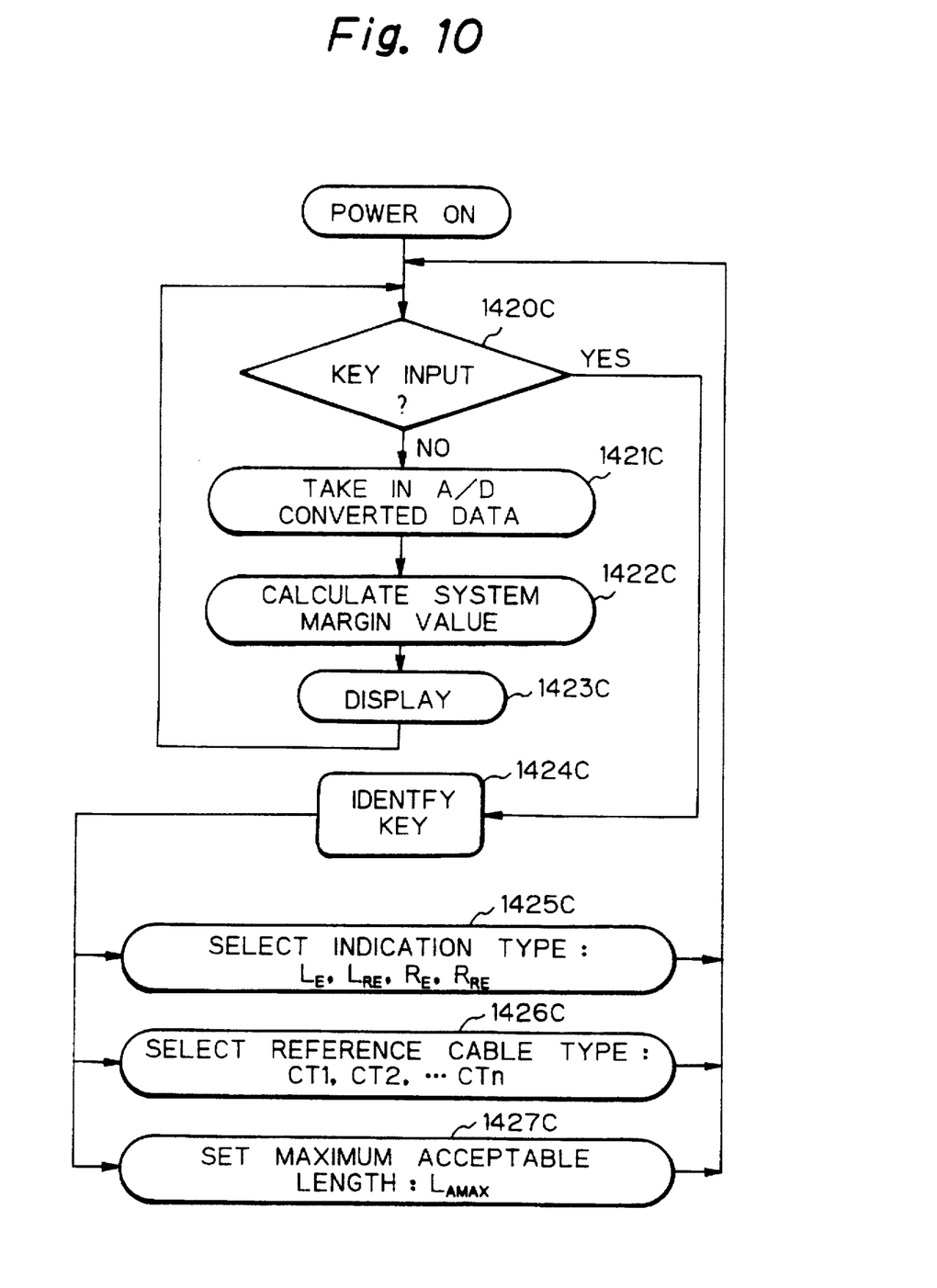
FIG. 10 is a flow chart showing the flow of a system margin calculation program executed by a CPU 140C shown in FIG. 9.
Figure 11:
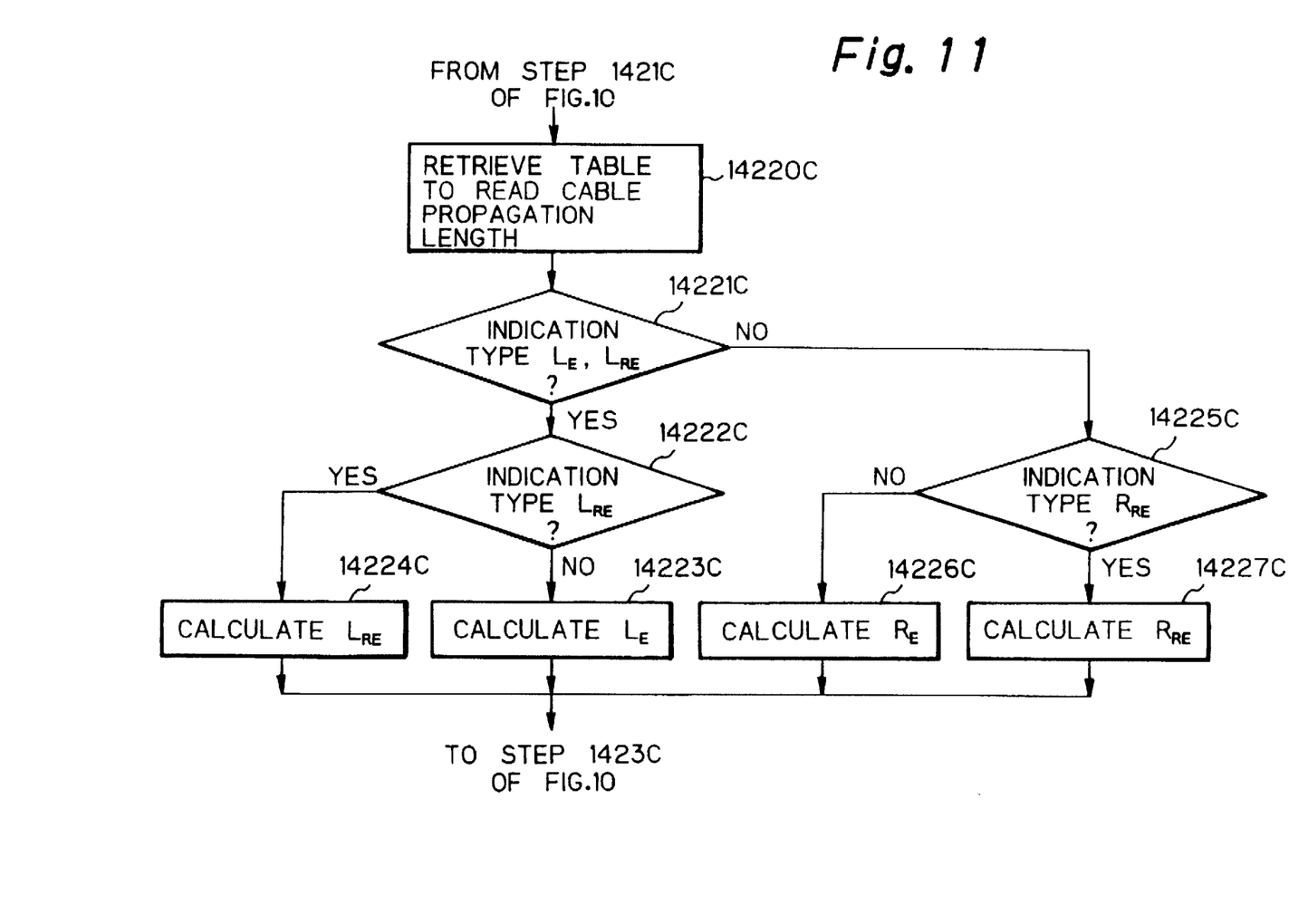
FIG. 11 is a flow chart showing a step 1422C of FIG. 10 in more detail.

Referring now to FIGS. 9 to 11, an evaluator circuit 14C will be described which is a specific embodiment of the evaluator circuit 14B in FIG. 8 and is implemented using a microprocessor. As shown, the evaluator circuit 14C includes an analog-to-digital (A/D) converter 141C having an input for receiving the filter control signal FC, a central processing unit (CPU) 140C having an input for receiving an output from the A/D converter 141C, an input device 142C such as a keyboard for entry to the CPU 140C, a storage device 148C connected to the CPU 140C (in which at least a system margin calculation program and the tables TB1–TBn are stored) and a display device 149C such as a cathode ray tube (CRT) or a liquid crystal display (LCD) for display of a calculated system margin. The input device 142C has numerical keys as well as a reference cable type selection key, an indication type selection key and a maximum acceptable length setting key (none of them are shown).

FIGS. 10 and 11 show flow charts of the system margin calculation program executed by the CPU 140C. First, when the CPU 140C is powered on, it determines if a key input is present (step 1420C). If not, selected and set conditions stored are used, and the program proceeds to a calculation/display part of flow constituted by steps 1421C–1423C. If present, the program proceeds to a selection/setting part of flow consisting of steps 1424C–1427C.

In the selection/setting part of flow, the program identifies the key at step 1424C and then the program goes to step 1425C if it is the indication type selection key, to 1426C if it is the reference cable selection key, and to 1427C if it is the maximum acceptable length setting key. At step 1425C, a desired one of the four indication types including equivalent-line-length ($L_E$), equivalent-remaining-line-length ($L_{RE}$), equivalent-line-length-ratio ($R_E$) and equivalent-remaining-line-length-ratio ($R_{RE}$) is selected. At step 1426C, a desired one of the cable types CT1–CTn is selected. At step 1427C, numerical keys are used to set a desired value for the maximum acceptable length ($L_{AMAX}$). From any of these steps, the program returns to step 1420C.

In the calculation/display part of flow, the digital output of the A/D converter 141C is taken in (step 1421C), a system margin being calculated under the current selected and set conditions (step 1422C), and the result of the calculation being generated to the display device 149C (step 1423C).

FIG. 11 shows the step 1422C in FIG. 10 in more detail. Starting with the first step 14220C, one of the LU tables that corresponds to the selected cable type is retrieved. Assuming that the cable type CT1 has been selected, the table TB1 is retrieved such that a cable propagation length $L_P$ is read out which corresponds to the A/D converter value of the filter control signal FC. Here, various known interpolations can be employed. Then, with respect to the indication type, a check is made to determine whether the length type indication or ratio type indication has been selected (step 14221C), and then a check is made to determine whether the line-length type indication or remaining-line-length type indication has been selected (step 14222C and step 14225C). As a result, a system margin is calculated in accordance with one of the equations in Table 1 above at a step 14223C if the equivalent-line-length ($L_E$) indication has been selected, at step 14224C if the equivalent-remaining-line-length ($L_{RE}$) indication has been selected, at step 14226C if the equivalent-line-length-ratio ($R_E$) indication has been selected, or at step 14227C if the equivalent-remaining-line-length-ratio ($R_{RE}$) indication has been selected. After the calculation, the program goes to step 1423C where the display device displays the calculated system margin, preferably by numerical representation. It should be noted that the display may be made in various modes of display other than the digital mode of display such as numerical representation, for example, an analog mode of display such as indicator representations shown in FIGS. 7(a)–7(e).

The above described evaluator device 14C is advantageous in that it is easy to change the number of look-up tables, a selected reference cable and/or a maximum acceptable length. For example, different broadcasting stations may use different types of cables for a transmission line and thus may use different reference cables. Under such circumstances, the evaluator device 14C is very advantageous.

Various modifications can be effected to the embodiments described above. First, although the embodiments shown in FIGS. 2 to 11 have been described in connection with a transmission system including a coaxial cable used as the transmission medium of the system, the embodiments are also applicable to transmission systems including as transmission media thereof other types of wire transmission lines such as fiber optics cables, or even wireless transmission paths. Second, the embodiments shown in FIGS. 2 to 11 are applicable in principle to transmission systems which are used to transmit parallel digital signals (e.g., those defined by SMPTE 244M standard (composite signals with transmission rate of 14.3 Mbps) and SMPTE 125M standard (component signals with transmission rate of 27 Mbps)). Third, the embodiments are also applicable to such transmission systems which transmit signals other than video signals.

According to the present invention thus described, the system margin of substantially the whole of a transmission system can be evaluated, because the evaluation is based on the signal (for example, an operational signal) appearing at the receiving end of the transmission medium of the transmission system. Further, the system margin evaluation can be made with higher accuracy, because the evaluation is made without using any known length of additional cable and is based on the received signal. Moreover, the present invention enables the system margin evaluation to be performed using a simple transmission system evaluator, and makes it unnecessary to use any known length of cable or any wide-bandwidth oscilloscope. In addition, according to the present invention, since a transmission system evaluator can be constituted using an equalizer, if there already exists some equipment incorporating an equalizer, such an equalizer may be utilized, resulting in realizing a transmission system evaluator at a low additional cost.

What is claimed is:

1. An evaluation method for evaluating a system margin of a digital transmission system, the method comprising:

a) receiving a digital signal transmitted through said digital transmission system;

b) detecting a decrease in signal power of said transmitted digital signal, detection of the signal power decrease comprising:

i. extracting, from said transmitted digital signal, components within a predetermined frequency band, the extracted components forming an extracted output;

ii. detecting a magnitude of power of said extracted output, the detected magnitude forming a detected output; and iii. detecting a difference between said detected output and a predetermined reference value, the detected difference corresponding to said detected signal power decrease; and c) generating an indication relating to the system margin of said transmission system based on the detected signal power decrease.

2. A method according to claim 1, wherein:

said transmission system includes a transmission medium; and wherein:

generating the indication includes representing said indication relating to the system margin in a unit associated with a length of said transmission medium.

3. A method according to claim 2, wherein:

generating the indication includes using a known relationship between a propagation length and a signal power decrease of a signal, with respect to at least one type of known transmission medium.

4. A method according to claim 3, wherein:

generating the indication includes generating said indication relating to the system margin with respect to a selected one of a plurality of different types of transmission media.

5. A method according to claim 3 or 4, wherein:
said indication relating to the system margin is generated based on the propagation length of a signal through said transmission medium.

6. A method according to claim 5, wherein:
said indication relating to the system margin is represented by said propagation length.

7. A method according to claim 5, wherein:
said indication relating to the system margin is represented by the ratio of said propagation length to a maximum acceptable propagation length of said transmission medium.

8. A method according to claim 3 or 4, wherein:
said indication relating to the system margin is generated based on an acceptable remaining propagation length, said acceptable remaining propagation length being equal to a difference between a maximum acceptable propagation length of said transmission medium and a propagation length through said transmission medium.

9. A method according to claim 8, wherein:
said indication relating to the system margin is represented by said acceptable remaining propagation length.

10. A method according to claim 8, wherein:
said indication relating to the system margin is represented by the ratio of said acceptable remaining propagation length to said maximum acceptable propagation length of said transmission medium.

11. A method according to claim 2, wherein:
said predetermined frequency band includes at least a frequency band within which said digital signal is most strongly affected by said transmission medium during transmission of said digital signal through said transmission medium.

12. A method according to any one of claims 2 to 4, wherein:
said transmission medium comprises a wire transmission path.

13. A method according to claim 12, wherein:
said wire transmission path comprises a coaxial cable.

14. A method according to claim 12, wherein:
said wire transmission path comprises a fiber optics cable.

15. A method according to any one of claims 2 to 4, wherein:
said transmission medium comprises a wireless transmission path.

16. A method according to any one of claims 1 to 4, wherein:
said digital signal is a serial digital signal.

17. An evaluation apparatus for evaluating a system margin of a digital transmission system comprising:
a) an input terminal for receiving a digital signal transmitted through said transmission system;
b) a signal power decrease detecting means for detecting a decrease in signal power of said transmitted digital signal received at said input terminal, said signal power decrease detecting means comprising:
i. extracting means for extracting, from said transmitted digital signal received at said input terminal, frequency components within a predetermined frequency band to form an extracted output, said predetermined frequency band including at least a frequency band within which said digital signal is most strongly affected by said transmission system during transmission of said digital signal through said transmission system;

ii. detecting means, coupled to said extracting means, for receiving said extracted output from said extracting means and for detecting a magnitude of power of said extracted output, the detected magnitude represented as a detected output; and iii. difference detecting means, coupled to said detecting means, for receiving said detected output and for detecting a difference between said detected output and a predetermined reference value, the detected difference corresponding to said detected signal power decrease; and c) an evaluator means for generating an indication relating to the system margin of said transmission system based on the detected signal power decrease.

18. An apparatus according to claim 17, wherein:
said transmission system includes a transmission medium; and wherein:
said evaluator means represents said indication relating to the system margin in a unit associated with a length of said transmission medium.

19. An apparatus according to claim 18, wherein:
said evaluator means uses a known relationship between a propagation length and a signal power decrease of a signal, with respect to at least one type of known transmission medium.

20. An apparatus according to claim 19, wherein:
said evaluator means generates said indication relating to the system margin with respect to a selected one of a plurality of different types of transmission media.

21. An apparatus according to claim 19 or 20, wherein:
said indication relating to the system margin is based on the propagation length of a signal through said transmission medium.

22. An apparatus according to claim 19 or 20, wherein:
said indication relating to the system margin is based on an acceptable remaining propagation length, said acceptable remaining propagation length being equal to a difference between a maximum acceptable propagation length of said transmission medium and a propagation length through said transmission medium.

23. An apparatus according to any one of claims 17 to 20, wherein:
said signal power decrease detecting means comprises an equalizer-based detector internally generating an equalization control variable signal for controlling an amount of equalization, said equalization control variable signal serving as said signal power decrease.

24. An apparatus according to claim 23, wherein said equalizer-based detector comprises:
a) summing means having a first input for receiving said transmitted digital signal received at said input terminal, a second input and an output for generating a sum of said first and second inputs;

b) a variable filter having an input for receiving said transmitted digital signal and an output connected to said second input of said summing means;

c) a peak detector having an input coupled to said output of said summing means for detecting a level of said output of said summing means; and d) a filter control circuit having a first input for receiving the detected level from said peak detector and an output for generating a filter control signal for controlling said variable filter in response to the detected level received at said first input and a predetermined reference value, said filter control signal being operative to adjust a characteristic of said variable filter so as to cause said output of said peak detector to be equal to said predetermined reference value;

said filter control signal serving as said equalization control variable signal.

25. An apparatus according to any one of claims 17 to 20, wherein said evaluator means comprises:

a) an amplifier; and b) an indicator adapted to receive an output of said amplifier and including scale means for indication.

26. An apparatus according to claim 25, wherein:

said scale means comprises at least one scale.

27. An apparatus according to claim 25, wherein:

said amplifier has an adjustable variable gain.

28. An apparatus according to claim 25, wherein:

said amplifier has an adjustable variable characteristic.

29. An apparatus according to any one of claims 17 to 20, wherein said evaluator means comprises:

a) look-up table storage means storing a look-up table for correlating a signal power decrease of a signal with a propagation length of the signal with respect to at least one type of known transmission medium;

b) means for generating a reference transmission medium type specifying signal, said reference transmission medium type specifying signal being operative to specify, among said at least one type of known transmission medium, a reference type of transmission medium for indication of the system margin;

c) means for generating a margin indication type specifying signal, said margin indication type specifying signal being operative to specify a type of system margin indication;

d) means for generating a maximum acceptable propagation length specifying signal, said maximum acceptable propagation length specifying signal being operative to specify a maximum acceptable propagation length of said reference type of transmission medium;

e) system margin calculation means for calculating a value of the system margin in a unit associated with a length of said reference type of transmission medium, in response to said detected power decrease from said detecting means, said reference transmission medium type specifying signal, said margin indication type specifying signal and said maximum acceptable propagation length specifying signal; and f) display means for displaying the calculated value of the system margin.

30. An apparatus according to any one of claims 18 to 20, wherein:

said transmission medium comprises a wire transmission path.

31. An apparatus according to any one of claims 17 to 20, wherein:

said transmission medium comprises a wireless transmission path.

32. An apparatus according to any one of claims 17 to 20, wherein:

said digital signal is a serial digital signal.

* * * * *